United States Patent

[11] 3,601,864

[72] Inventors Arnold E. Roberts;
 Charles F. Crissy, both of Jackson, Mich.
[21] Appl. No. 19,052
[22] Filed Mar. 12, 1970
[45] Patented Aug. 31, 1971
[73] Assignee Aeroquip Corporation
 Jackson, Mich.

[54] CHAIN TENSIONER
 12 Claims, 6 Drawing Figs.
[52] U.S. Cl. .................................................... 24/68 CT,
 248/361 A
[51] Int. Cl. .................................................... B65d 63/00,
 A43c 11/00
[50] Field of Search ........................................ 24/68 CT,
 68 CD; 248/361 A

[56] References Cited
UNITED STATES PATENTS

| | | | |
|---|---|---|---|
| 1,159,472 | 11/1915 | Christofferson .............. | 24/68 CT UX |
| 2,604,678 | 7/1952 | Mayes .......................... | 24/68 CT |
| 3,142,877 | 8/1964 | Lesley ........................... | 24/68 CTD |
| 3,366,997 | 2/1968 | Lesley ........................... | 24/68 CTD |
| 3,426,996 | 2/1969 | Broling ......................... | 248/361 A |

*Primary Examiner*—Donald A. Griffin
*Attorney*—Jerry K. Harness

ABSTRACT: A device for creating tension in a chain used to tie down cargo. A shaft has one end attachable to a deck and the other threadably adjustable in a hollow body the outer end of which carries a chain attaching head. A hook-shaped latch in the head is movable between a releasing position and a latching position in which it will hold a captive grab link carried by the chain. The latch is released by a rotatable ring on the head. When in its released position, the latch is ready to receive the grab link for relatching.

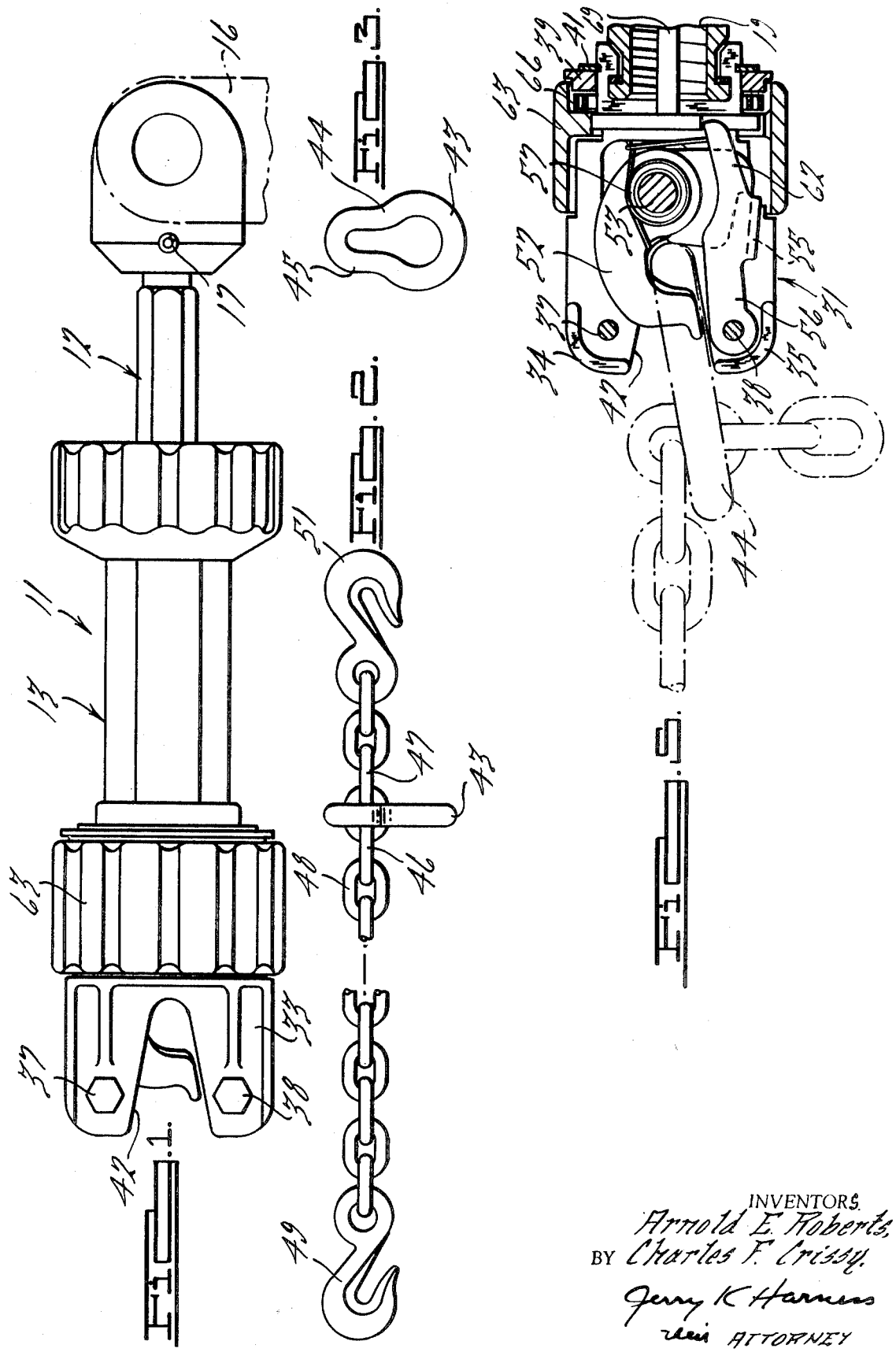

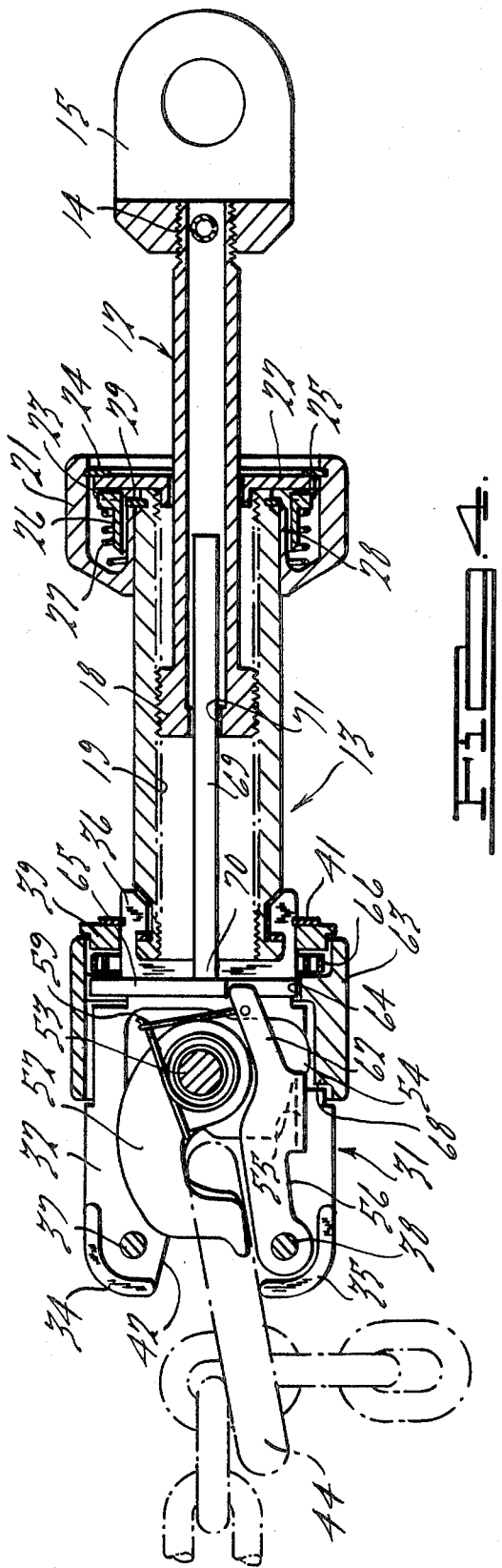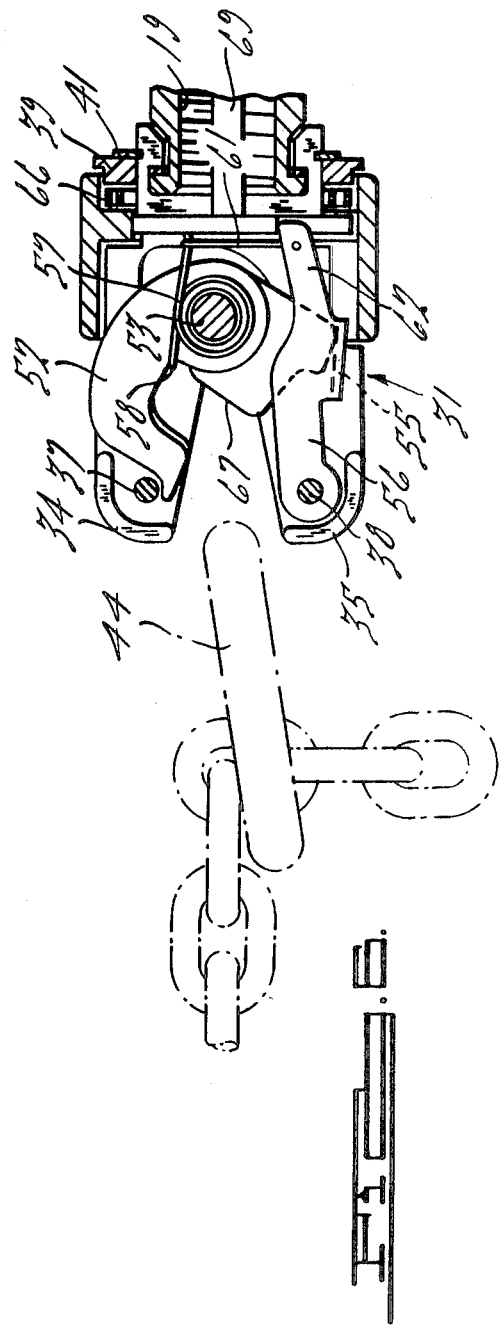
INVENTORS.
Arnold E. Roberts,
BY Charles F. Crissy.
Jerry K Harness
their ATTORNEY.

CHAIN TENSIONER

BACKGROUND OF THE INVENTION

1. Field of the Invention

The invention relates to tensioning devices used in connection with securing cargo to decks, and particularly to chain tensioners. Devices of the type may be shortened in length after attachment to the chain in order to create tension, and the chain may be released quickly without having to gradually release the tension.

2. Description of the Prior Art

The prior art is exemplified by U.S. Pat. No. 3,142,877 issued Aug. 4, 1964. This prior art device however has several drawbacks which it is an object of the present invention to overcome.

In the patented device, a chain link is received in a formed latch, and it is essential that the proper end of the chain be secured to the cargo in order for the device to operate effectively. With inexperienced personnel, there is the likelihood that tension will be placed in the wrong end of the chain.

The prior art device also has exposed takeup threads which may be subject to damage, and the release lever is only accessible from one side of the device so that it must be oriented properly to provide good access. After release of the latch mechanism in the patented device, the parts must be manually repositioned before the chain can be reinstalled, and this operation is not obvious to untrained operators. Another disadvantage of the prior tensioner is that a special spanner or strap wrench is required to create more tension than can be attained by hand.

BRIEF SUMMARY OF THE INVENTION

The present invention overcomes these difficulties in the prior art tensioner and provides a device which is connectable to a grab link captive to the chain assembly, after which either or both ends of the chain may be tensioned. The takeup threads in the new device are concealed and therefore not subject to damage, and a release ring is provided which is accessible from all sides of the tensioner.

The latch is a hook-shaped member pivotally mounted in a head on the outer end of the internally threaded takeup member. When the latch is in its releasing position, it is engageable by the grab link to rotate it to its latching position, where it is held by a detent. No repositioning of the latch is needed after it has released the chain in order to be ready to accept reattachment.

The telescoping takeup members comprise a shaft attachable to the deck and a hollow body in which the shaft is threaded and which carries the head at its outer end. Both the shaft and body are of hexagonal shape so that a wrench may be applied to the body to achieve greater tension than is possible by manual rotation of the body.

BRIEF DESCRIPTION OF THE DRAWINGS

FIG. 1 is an elevational view of the chain tensioner;

FIG. 2 is an elevational view of a chain which is to be attached to the tensioner;

FIG. 3 is a side view of the captive grab link;

FIG. 4 is a cross-sectional view of the tensioner showing the retention of a grab link by the latch;

FIG. 5 is a view of the tensioner head showing the latch at the moment of release of the grab link; and FIG. 6 is a view similar to FIG. 5 but showing the complete release of the grab link.

DESCRIPTION OF THE PREFERRED EMBODIMENT

The chain tensioner is generally indicated at 11 and comprises a shaft generally indicated at 12 and a hollow body generally indicated at 13 within which the shaft extends. Shaft 12 is of hexagonal cross-sectional shape and of hollow construction as seen in FIG. 4. The shaft is threaded at one end 14 and secured to a clevis 15 adapted to be attached to a deck fitting 16 (FIG. 1). A pin 17 passes through clevis 15 and shaft 12 to secure the parts together.

The other end 18 of shaft 12 is enlarged and externally threaded, the threads interfitting with the internal threads 19 of body 13. The body is also of hexagonal cross-sectional shape and carries a knob 21 which may be grasped by the operator and rotated to rotate the body with respect to shaft 12, thus adjusting the two parts axially. A member 22 is slidably but nonrotatably mounted on shaft 12 and carries a plurality of circumferentially spaced radially extending teeth 23. Member 22 is disposed within hollow knob 21 and held therein by a snap ring 24 carried by the knob. Teeth 23 coact with the teeth 25 of a detent ring 26 within knob 21, the ring being urged against teeth 23 by a spring 27. Detent ring 26 is slidably but nonrotatably mounted on the hexagonally shaped sleeve 28 of knob 21 which engages body 13, this sleeve being held in place by a snap ring 29. Thus, when knob 21 is rotated detent ring 26 will rotate with it and teeth 25 thereof will ride along teeth 23, the teeth have inclined side surfaces. The adjusted position of the body and shaft will therefore be maintained by interengagement of these teeth.

A latching head 31 is rotatably mounted on the end of body 13 remote from knob 21. Head 31 comprises a pair of shell halves 32 and 33 which have mating flat surfaces 34, 35 and 36 and are held together by bolts 37 and 38 as well as by a ring 39, the latter being held in place by a snap ring 41. The outer ends of shell halves 32 and 33 have outwardly flared openings 42 which are adapted to receive the wide portion 43 of a grab link 44, shown in FIGS. 2 and 3. This grab link is of conventional construction, having a narrow portion 45 adapted to slip between a pair of links 46 and 47 of a chain 48. The chain has a pair of hooks 49 and 51 either or both of which may be attached to cargo (not shown).

A hook-shaped latch 52 is rotatably mounted on a pivot 53 within head 31 and is adapted to engage portion 43 of grab link 44 to hold the grab link as shown in FIG. 4. Latch 52 has a shoulder 54 engageable by a portion 55 of a detent 56 in head 31 to hold the latch in its latching position. Detent 56 is pivotally mounted on bolt 38 and is movable between the holding position shown in FIG. 4, and the retracted position shown in FIG. 6, shoulder 55 being withdrawn from shoulder 54 in the latter position. Latch 52 may thus swing clockwise from its FIG. 4 to its FIG. 6 position, FIG. 5 showing the latch just before it is released by the detent. A coil spring 57 surrounds pin 53 and has one end 58 engaging latch 52, the other end 59 being connected by a link 61 to an arm 62 of detent 56, so that the detent is urged toward its holding position shown in FIG. 4.

Means are provided for preventing accidental dislodgment of detent 56 but at the same time permitting easy actuation of the detent to release latch 52. This means includes a release ring 63 rotatably mounted on head 31 and ring 39. This release ring has an inner cam surface 64 engageable with a pin 65 mounted for radial movement within head 31. The outer end of pin 65 engages cam surface 64 and the inner end engages arm 62 of detent 56. A spiral spring 66 connected between head 31 and release ring 63 urges the release ring toward the position shown in FIG. 4, in which the most shallow portion of cam surface 64 is opposite pin 65. When in this position, detent 56 will be in its holding position as shown in FIG. 4. However, upon manual rotation of release ring 63, cam surface 64 will push pin 65 downwardly from its FIG. 4 to its FIG. 5 and then its FIG. 6 position. This will swing detent 56 clockwise until it releases latch 52, permitting grab link 44 to be removed as latch 52 swings clockwise to the position of FIG. 6 under the influence of spring 57. A shoulder 67 on latch 52 will then face slots 42.

When ring 63 is released, spring 66 will tend to return it toward its FIG. 4 position, but latch 52 and detent 56 will remain in their FIG. 6 positions. A boss 68 on the interior of ring 63 will engage detent 56, preventing ring 63 from fully returning to its FIG. 4 position. The main portion of latch 52 will be withdrawn from slots 42 so that grab link 44 may enter, the latch being held in this position by spring 57. Shoulder 67 on latch 52 will face grab link 44 as it enters slots 42. As grab link 44 engages shoulder 67 it will swing latch 52 counterclockwise from its FIG. 6 to its FIG. 4 position, shoulder 54 snapping behind shoulder 55 of detent 56. At this time latch 52 will cross slots 42 and hold portion 43 of the grab link in latched position. Detent 56 will be lifted by spring 57 and link 61 to its FIG. 4 position, clearing boss 68 and permitting ring 63 to return to its FIG. 4 position.

The means for preventing accidental dislodgment of detent 56 when in its FIG. 4 position includes boss 68 on the interior of ring 63 which opposes shoulder 55 only when ring 63 is in its FIG. 4 position, that is, when detent 56 is in its holding position. It will be noted that any vibration or impact forces which might otherwise dislodge shoulder 55 from its holding engagement with shoulder 54 of latch 52 will be prevented by the presence of boss 68.

In operation, starting with a condition in which latch 52 is withdrawn from slots 42, as seen in FIG. 6, grab link 44 will be inserted in slots 42 and forced against shoulder 67 of the latch, swinging the latch to its FIG. 4 position. During this time release ring 63 will of course move to its FIG. 4 position.

Either hook 49 or 51 or both may then be attached to the cargo, and tensioning nut 21 rotated by hand until the proper tension is created in the chain. If more tension is desired, wrenches may be applied to hexagonal body 13 as well as shaft 12. Teeth 23 and 25 will coact to hold the parts in their adjusted position. In order to prevent rotation of shaft 12, a key 69 of noncircular cross section is secured at one end 70 to head 31 and extends through a complementary noncircular opening 71 in the inner end of shaft 12.

When it is desired to release the chain, releasing ring 63 will be rotated, this ring being accessible from any direction. This will cause pin 65 to rotate detent 56 clockwise until it releases latch 52 which will then swing to its FIG. 6 position, permitting withdrawal of the grab link.

What is claimed is:

1. In a tensioning device, a pair of telescoping members, means at the outer end of one of said members for securing it to a deck fitting, means for axially adjusting said members relative to each other, a head mounted at the outer end of the second member, there being an outwardly open slot on said head for receiving a grab link carried by a chain, a latch pivotally mounted in said head and movable between latching and releasing positions, the latch when in its latching position having a portion crossing said slot so as to secure the grab link to the head, said portion when in its releasing position being clear of said slot, a first shoulder on said latch, a detent mounted in said head and movable between a holding position in which it engages said first latch shoulder to hold the latch in its latching position, and a retracted position in which the latch is free to move to its releasing position, and a second shoulder on said latch extending across said slot when the latch is in its releasing position, whereby a grab link inserted in the slot will engage said second shoulder and swing said latch to its latching position.

2. The combination according to claim 1, said telescoping members comprising a shaft and a body each having a noncircular cross section, said shaft being securable to said deck fitting and having an externally threaded portion receivable by an internally threaded bore in said body.

3. The combination according to claim 2, further provided with a member slidably but nonrotatably mounted on said shaft and having a plurality of radially extending teeth thereon, and a member secured to said body and having teeth interengageable with said last-mentioned teeth to hold the two members in their adjusted position.

4. The combination according to claim 3, further provided with a tensioning knob mounted on said body for rotation thereof relative to said shaft, said toothed members being enclosed by said knob, and a spring within said knob urging said second-toothed member against the first-toothed member.

5. The combination according to claim 2, further provided with a releasing ring rotatably mounted on said head, and means interconnecting said releasing ring with said detent whereby rotation of said releasing ring will move the detent from its holding to its retracted position.

6. The combination according to claim 5, further provided with a spring urging said releasing ring to a position in which said detent is permitted to move to its holding position, and spring means urging said detent toward its holding position and urging said latch toward its releasing position.

7. The combination according to claim 1, further provided with a releasing ring rotatably mounted on said head, and means interconnecting said releasing ring with said detent whereby rotation of said releasing ring will move the detent from its holding to its retracted position.

8. The combination according to claim 7, further provided with a spring urging said releasing ring to a position in which said detent is permitted to move to its holding position, and spring means urging said detent toward its holding position and urging said latch toward its releasing position.

9. The combination according to claim 7, said last-mentioned means comprising a radially movable pin mounted within said head, and a cam surface on the interior of said ring, said pin interconnecting said cam surface with said detent.

10. The combination according to claim 9, further provided with a boss on the interior of said ring, and spring means urging said releasing ring toward a position in which said boss is in obstructing relation with said detent when the latter is in its holding position, whereby the detent may not be dislodged from said holding position.

11. The combination according to claim 7, said head comprising a pair of oppositely facing shell members, and a ring holding said shell members together and rotatably supporting said releasing ring.

12. The combination according to claim 11, said telescoping members comprising an externally threaded hollow shaft securable to said deck fitting and a hollow body within which said shaft is threaded, said head being rotatably mounted on said body, and a key of noncircular cross section carried by said head and slidably but nonrotatably connected to said shaft.